United States Patent [19]

Wingrove

[11] Patent Number: 4,767,809

[45] Date of Patent: Aug. 30, 1988

[54] ELASTOMERIC COMPOSITION HAVING IMPROVED CUT GROWTH RESISTANCE

[75] Inventor: Donald E. Wingrove, Cheshire, Conn.

[73] Assignee: Uniroyal Chemical Company, Inc., Middlebury, Conn.

[21] Appl. No.: 918,941

[22] Filed: Oct. 14, 1986

[51] Int. Cl.$^4$ .................................................. C08K 5/18
[52] U.S. Cl. .................................... 524/255; 524/254; 524/525; 524/526
[58] Field of Search ................................ 524/254, 255

[56] References Cited

U.S. PATENT DOCUMENTS

| | | | |
|---|---|---|---|
| 3,179,718 | 4/1965 | Wei | 260/889 |
| 3,299,175 | 1/1967 | Marchesini | 260/876 |
| 3,419,639 | 12/1968 | Gentile | 524/255 |
| 3,492,370 | 1/1970 | Wirth | 260/889 |
| 3,492,371 | 1/1970 | Barrett | 260/889 |
| 3,646,168 | 2/1972 | Barrett | 260/889 |
| 3,646,169 | 2/1972 | Wirth | 260/889 |
| 3,658,639 | 4/1972 | Wirth | 161/243 |
| 3,678,135 | 7/1972 | Mastromatteo et al. | 260/889 |
| 3,706,819 | 12/1972 | Usamoto et al. | 260/889 |
| 3,830,881 | 3/1974 | Woods et al. | 524/255 |
| 3,839,275 | 10/1974 | Wilder | 524/255 |
| 3,937,862 | 2/1976 | Dillenschneider | 428/409 |
| 4,138,389 | 2/1979 | Edwards | 260/45.7 R |
| 4,297,269 | 10/1981 | Merten et al. | 524/255 |
| 4,350,795 | 9/1982 | Bohm et al. | 525/194 |
| 4,645,793 | 2/1987 | Von Hellens et al. | 524/518 |

OTHER PUBLICATIONS

S. G. Gallo, H. K. Wiese and J. F. Nelson, "Unsaturation in Isoprene-Isobutylene Copolymers", Industrial and Engineering Chemistry, vol. 40, No. 7, pp. 1277–1280 (1948).

S. P. Manik and S. Banerjee, "Sulfenamide Accelerated Sulfur Vulcanization of Natural Rubber in Presence and Absence of Dicumyl Peroxide", Rubber Chemistry and Technology, vol. 43, No. 6, pp. 1311–1326 (1970).

"Peroxide Curing of Rubber": Thomas L. Purakel and Robert L. Burper, Pennwalt Corp., Elastomerics, Jul. 1987, pp. 19–26.

Bulletin ORC-101B: Hercules Incorporated, Technical Data, pp. 12–13.

Primary Examiner—Lewis T. Jacobs
Attorney, Agent, or Firm—Raymond D. Thompson

[57] ABSTRACT

Elastomeric compositions produced by curing blends comprising (A) a highly unsaturated rubber; (B) a saturated rubber; (C) a phenylenediamine compound and (D) a curing agent comprised of (i) sulfur and/or a sulfur donor compound, (ii) a sulfur cure accelerator, and (iii) a peroxide curative; wherein between about 1 and about 10 parts by weight of (C) per 100 parts by weight of (A) plus (B) is present exhibit unexpectedly high resistance to cut growth. In addition, a process for producing such rubber compositions is disclosed.

19 Claims, No Drawings

ELASTOMERIC COMPOSITION HAVING IMPROVED CUT GROWTH RESISTANCE

FIELD OF THE INVENTION

This invention relates to an elastomeric composition produced by curing a blend comprising (A) a highly unsaturated rubber; (B) a saturated rubber; (C) a phenylenediamine compound; and (D) a curing agent comprised of (i) sulfur and/or a sulfur donor compound, (ii) a sulfur cure accelerator, and (iii) a peroxide curative; wherein between about 1 and about 10 parts by weight of (C) per 100 parts by weight of (A) plus (B) is present, which compositions exhibit unexpectedly high resistance to cut growth under dynamic conditions. In another aspect, this invention relates to a process for producing said rubber composition.

BACKGROUND OF THE INVENTION

An important property which must be present in elastomeric compositions employed in a variety of uses, such as in tires for off-road and heavy service vehicles, belts, hoses, dust boots, diaphragms and other flexible mechanical devices, is desirable resistance to cut growth. Cut growth resistance under dynamic conditions, which is determined by means of the De Mattia flex test (ASTM D-430), is essential for such devices to provide a desirable long service life.

Moreover, it would be highly desirable to have available rubber blends which combine the toughness and other desirable properties of highly unsaturated rubbers (such as oil resistance in the case of butadiene/acrylonitrile rubber) with the ozone resistance of saturated rubbers (such as ethylene-propylene elastomers), which blend would additionally exhibit desirable cut growth resistance.

In the past, producrng a cured blend of highly unsaturated and saturated rubbers has been difficult, with the resulting product typically exhibiting physical properties inferior to those of such rubbers alone. This phenomenon is commonly ascribed to the co-cure incompatibility of unsaturated and saturated rubbers due to their polarity and differing degrees of saturation. In addition, migration of curatives between the saturated and unsaturated components can also lead to curing difficulties. Moreover, there has been no indication of unexpectedly enhanced cut growth in such compositions.

Consequently, it would be desirable to have a rubber composition which exhibited the toughness of highly unsaturated rubber and the ozone resistance of saturated rubber, which rubber composition additionally provided enhanced resistance to cut growth Accordingly, it is an object of this invention to provide a rubber composition which exhibits desirable strength and resistance to oxidation, which composition also possesses desirable resistance to cut growth.

It is a further object of this invention to provide a process for the production of such a rubber composition.

The above and additional objects will become more fully apparent from the following description and Examples.

DESCRIPTION OF THE INVENTION

In one aspect, this invention relates to a rubber composition produced by curing a blend comprising:

(A) at least one highly unsaturated rubber;
(B) at least one saturated rubber
(C) a phenylenediamine compound; and
(D) an effective amount of a curing agent comprising:
  (i) sulfur and/or a sulfur donor compound
  (ii) at least one sulfur cure accelerator:
  (iii) at least one peroxide curative:

wherein between about 1 and about 10 parts by weight of component (C) per 100 parts by weight of components (A) plus (B) is present.

In another aspect, this invention is directed to a process for producing a cured composition, which process comprises the steps of:

(I) preparing a blend comprising:
  (A) at least one highly unsaturated rubber:
  (B) at least one saturated rubber;
  (C) a phenylenediamine compound; and
  (D) an effective amount of a curing agent comprising:
    (i) sulfur and/or a sulfur donor compound;
    (ii) at least one sulfur cure accelerator: and
    (iii) at least one peroxide curative;

wherein between about 1 and about 10 parts by weight of (C) per 100 parts by weight of (A) plus (B) is present: and (II) subjecting said blend to curing conditions.

As is employed herein, the term "highly unsaturated rubber" refers to a rubber having an iodine number of 50 or more. The term "saturated rubber" refers to a rubber having an iodine number of less than 50, and thus encompasses rubbers having a low degree of unsaturation as well as truly unsaturated rubbers The iodine number of a particular rubber compound may be determined in accordance with the method disclosed by S. G. Gallo, H. K. Wiese, and J. F. Nelson in "Unsaturation in IsopreneIsobutylene Copolymers", Industrial and Engineering Chemistry, Vol 40, pp. 1277–80 (1948).

Moreover, as is employed herein, the term "peroxide" includes hydroperoxide curatives as well as peroxide curatives.

Representative of the highly unsaturated rubbers which may be employed in the practice of this invention are diene rubbers. Such rubbers will typically possess an iodine number of between about 100 and about 250, although highly unsaturated rubbers having a higher or a lower (i.e., of 50-100) iodine number may also be employed. Illustrative of the diene rubbers which may be utilized are polymers based on conjugated dienes such as 1,3-butadiene: 2-methyl-1,3-butadiene; 1,3-pentadiene: 2,3-dimethyl-1,3-butadiene: and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferred highly unsaturated rubbers include natural rubber, cis-polyisoprene, polybutadiene, poly(butadiene-styrene) and poly(butadiene-acrylonitrile). Moreover, mixtures of two or more highly unsaturated rubbers may be employed.

Most preferably, the highly unsaturated rubber employed in the composition of this invention is an conjugated diene/acrylonitrile copolymer, especially 1,3-butadiene/acrylonitrile copolymer. Although substituted dienes, such as 2-methyl-1,3-butadiene, 2,3-dimethyl-1,3-butadiene and the like, or other conjugated dienes, such as 1,3-pentadiene and the like, may be employed, the preferred comonomer for such nitrile rubbers is 1,3-butadiene. In general, such copolymers will comprise between about 10 and about 50, preferably between about 18 and about 45, and most preferably between 20 and about 40 weight percent acrylonitrile, with the conjugated diene typically comprising the remainder (up to 100 percent).

Illustrative of the saturated rubbers which may be employed are copolymers of ethylene with a copolymerizable monomer having the formula $CH_2=CHR$, wherein R is $C_1-C_{10}$ alkyl. Such copolymers may contain some unsaturation due to the incorporation of nonconjugated dienes such as dicyclopentadiene, 5-ethylidene-2-norbornene, 1,4-hexadiene and the like, but will not possess an iodine number of 50 or more. The nonconjugated diene content of the saturated rubbers employed may range from between 0 to about 20 weight percent. Moreover, mixtures of two or more saturated rubbers may be employed. The preferred saturated rubber is ethylene/propylene/nonconjugated diene terpolymer ("EPDM").

The highly unsaturated and saturated rubbers employed in this invention may possess molecular weights ranging from 50,000 or less to 500,000 or more. The preferred molecular weights for a given application may be readily determined by one skilled in the art by routine experimentation.

The phenylenediamine compounds, Component (C), are preferably para-phenylenediamines having the formula:

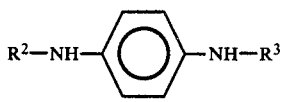

wherein $R^2$ and $R^3$ are each independently selected from the group consisting of hydrogen, $C_1-C_{12}$ straight chain, cyclic or branched alkyl, phenyl, and phenyl substituted with $C_1-C_8$ alkyl. Moreover, mixtures of these compounds may be employed. In general, preferred phenylene diamines are compounds having the above structure wherein $R^2$ is phenyl and $R^3$ is $C_3-C_8$ alkyl. Illustrative preferred phenylene diamines which may be employed include N-phenyl-N'-isopropyl-p-phenylenediamine, N-phenyl-N'-(1,3-dimethylbutyl)-p-phenylenediamine, N-phenyl-N'-(1,3-dimethylpentyl)-p-phenylenediamine, N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-diphenyl-p-phenyldiamine and N-phenyl-N'-cyclohexyl-p-phenylenediamine.

The curative system employed in the composition of this invention comprises sulfur and/or a sulfur donor compound, at least one sulfur cure accelerator and at least one organic peroxide curative.

The sulfur donor compounds which may be employed in conjunction with or in the alternative to sulfur are well known to those skilled in the art of rubber compounding. Illustrative of such sulfur donor compounds are 2-(4morpholinyldithio)benzothiazole, tetramethylthiuram disulfide, tetraethylthiuram disulfide, dipentamethylene thiuram hexasulfide, N,N'-carpolactam disulfide and the like.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like: xanthates, such as zinc dibutylxanthate and the like; dithiocarbamates, such as zinc dimethyldithiocarbamate, zinc diethyldithiocarbamate, zinc dibutyldithiocarbamate, sodium diethyldithiocarbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram monosulfide, tetraethylthiuram disulfide and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzothiazylsulfenamide, N-cyclohexyl2-benzothiazylsulfenamide, N,N-diisopropyl-2-benzothiazylsulfenamide and the like. Moreover, mixtures of two or more sulfur cure accelerators may be employed in the curing agent of this invention. The preferred accelerators are thiazoles and sulfenamides, with sulfenamides being particularly preferred.

The peroxides which may be employed in this invention have an activation temperature which is below the decomposition temperature of the rubbers employed. Illustrative of such peroxides are benzoyl peroxide, 1,3-bis(t-butylperoxyisopropyl)benzene, butyl 4,4-bis(-tbutylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and the like. Mixtures of two or more peroxides may also be employed. The preferred peroxides are dicumyl peroxide and 2,5-dimethyl-2,5-di-t-butylperoxyhexane.

Typically, between about 0.5 and about 200, preferably between about 5 and about 150, and most preferably between about 6 and about 14, gram atoms of sulfur per mole of peroxide are present in said curing agent.

The sulfur cure accelerator is generally present in amounts of between about 0.1 gram and about 5 grams per 100 grams of rubber, with preferably between about 0.3 gram and about 3.0 grams of accelerator per 100 grams of rubber being present. Most preferably, between about 0.3 gram and about 1.0 gram of accelerator per 100 grams of rubber are employed.

Generally, between about 0.2 and about 5, preferably between about 0.5 and about 3, and more preferably between about 0.5 and about 1.5 grams of sulfur per hundred grams of rubber are employed. Employing the ratios of sulfur to peroxide stated above, one skilled in the art can easily calculate the corresponding amount of the particular peroxide which is to be employed.

The weight ratio of highly unsaturated rubber, component (A), to saturated rubber, component (B), is generally between about 95:5 and about 50:50. Preferably, such weight ratio is between about 85:15 and about 60:40, and is most preferably between about 80:20 and about 70:30.

The phenylenediamine compound, component (C), is present in amounts of between about 1 and about 10, preferably of between about 1.5 and about 7, and most preferably of between about 2.5 and about 4, parts by weight per 100 parts by weight of components (A) plus (B).

In addition to the saturated rubber, the highly unsaturated rubber, the phenylenediamine compound and the three-component curing agent described above, the composition of this invention may further comprise zinc oxide, reinforcing agents, fillers, processing aids, extender oils, plasticizers, antidegradients, and the like, all of which additional components are well known to those skilled in the rubber art The blend of this invention is typically prepared by first mixing all the ingredients except the curing agent in a suitable mixing device (such as a Banbury type internal mixer, a two roll mill, or the like). Such mixing will typically require about 5 minutes, although shorter or longer mixing periods may be employed. This mixing may be performed at temperatures ranging from room temperature or cooler up to about 150° C. or higher. If mixing temperatures above the activation temperature of the curing agent are employed, upon completion of the mixing the blended rubber is cooled or allowed to cool to temperature below such activation temperature. The curing agent is then incorporated into the blend by subsequent mixing or milling.

Alternatively, the blend of this invention may be prepared by formulating a highly unsaturated rubber component and a saturated rubber component and blending desired amounts of the two components together In this alternative embodiment, the location of the elements of the curing agent (i.e. the peroxide, sulfur and/or sulfur donor and sulfur cure accelerator) is not critical, with any or all such elements being blended in either component or both Vulcanization of the blend may be carried out in a press, an oven or other suitable means until crosslinking has occured to a satisfactory state of cure Compounds produced in accordance with the process of this invention will exhibit desirable tensile properties and ozone resistance coupled with unexpectedly high cut growth resistance. As is demonstrated by the Examples below, such cut growth resistance is unexpected in view of the fact that 5-component systems—lacking either the saturated rubber component (B) or the phenylenediamine compound component (C)—demonstrate markedly inferior resistance to cut growth relative to the 6-component blends of this invention.

Moreover, the compositions of this invention do not exhibit the undesirable smell associated with most mixed sulfur/peroxide cures

EXAMPLES

The following Examples are intended to further illustrate the invention and are not intended to limit the scope of the invention in any manner.

EXAMPLES 1–7 AND COMPARATIVE EXPERIMENTS A–E

Employing the ingredients indicated in Table I, (which are listed in parts per hundred of rubber by weight) several rubber compositions were produced in an internal mixer as follows.

A total of 100 parts by weight of rubber, comprising of nitrile rubber (composed of 32.5 weight percent acrylonitrile and 67.5 weight percent butadiene) and ethylene/propylene/5-ethylidene-2-norbornene (E/P ratio equal to 70:30 by weight ENB = 8 weight percent Mooney viscosity (ML1+4) = 56 at 125° C.) along with zinc oxide and N-phenyl-N'-cyclohexyl-p-phenylenediamine (all present in the amounts listed in Table I below) were added to the mixer and mixing was commenced. After 1 minute, 45 parts of carbon black (N550) was added, After 2 more minutes, 1 part stearic acid, 2 parts Sunproof, Jr. (a blend of selected waxes, mp=63°-66° C.) and 10 parts plasticizer (dioctyl phthalate) were introduced into the mixer. When the mix reached a temperature of 132° C., an additional 10 parts of dioctyl phthalate were added. After mixing had been continued for another 2 minutes, the throat of the mixer was swept, and blending was continued for one more minute. The blend was then removed from the mixer and cooled On a mill, the curing agent, comprising 0.75 part sulfur, 3.5 parts 40 weight percent active dicumylperoxide on clay (Dicup 40 KE), and 1.5 parts sulfur cure accelerator, N-cyclohexyl-2-benzothiazole sulfenamide (Delac S) was added to the mixture. The components of the blends produced are indicated in Table I.

TABLE I

| EXAMPLE OR COMPARATIVE EXPERIMENT | A | B | C | D | E | 1 | 2 | 3 | 4 | 5 | 6 | 7 |
|---|---|---|---|---|---|---|---|---|---|---|---|---|
| Nitrile Rubber | 100 | 100 | 80 | 65 | 55 | 90 | 90 | 80 | 75 | 75 | 65 | 60 |
| EPDM | 0 | 0 | 20 | 35 | 45 | 10 | 10 | 20 | 25 | 25 | 35 | 40 |
| Phenylenediamine Compound Antiozonant | 0 | 3.0 | 0 | 0 | 0.5 | 2.0 | 1.0 | 3.0 | 2.0 | 1.5 | 3.0 | 1.5 |
| Zinc Oxide | 5 | 5 | 5 | 5 | 5 | 5 | 5 | 5 | 5 | 5 | 5 | 5 |
| Carbon Black | 45 | 45 | 45 | 45 | 45 | 45 | 45 | 45 | 45 | 45 | 45 | 45 |
| Wax | 2.0 | 2.0 | 2.0 | 2.0 | 2.0 | 2.0 | 2.0 | 2.0 | 2.0 | 2.0 | 2.0 | 2.0 |
| Stearic Acid | 1.0 | 1.0 | 1.0 | 1.0 | 1.0 | 1.0 | 1.0 | 1.0 | 1.0 | 1.0 | 1.0 | 1.0 |
| Dioctyl Phthalate (total) | 20 | 20 | 20 | 20 | 20 | 20 | 20 | 20 | 20 | 20 | 20 | 20 |
| Sulfur Cure Accelerator | 1.5 | 1.5 | 1.5 | 1.5 | 1.5 | 1.5 | 1.5 | 1.5 | 1.5 | 1.5 | 1.5 | 1.5 |
| Sulfur | 0.75 | 0.75 | 0.75 | 0.75 | 0.75 | 0.75 | 0.75 | 0.75 | 0.75 | 0.75 | 0.75 | 0.75 |
| Dicumylperoxide* | 3.50 | 3.50 | 3.50 | 3.50 | 3.50 | 3.50 | 3.50 | 3.50 | 3.50 | 3.50 | 3.50 | 3.50 |

*40 weight percent active on clay

The compounded stocks described above were sheeted out and samples of each blend were cut. These samples were cured at 171° C. for 15 minutes, and their physical properties determined. The dynamic properties of such samples were tested in accordance with ASTM D-412. The bent loop ozone resistance of the samples was tested in accordance with ASTM D-1149 at an ozone concentration of 50 parts per 100 million at 38° C. This test was terminated after 1,000 hours. Dynamic ozone testing was conducted in accordance with ASTM D-3395 method A with a 25% extension and an ozone concentration of 50 parts per 100 million. This test was terminated after 45 hours. The results of such testing are listed in Table II below.

TABLE II

| | Cured for 15 Minutes at 171° C. | | | | | | |
|---|---|---|---|---|---|---|---|
| | 1 | 2 | 3 | 4 | 5 | 6 | 7 |
| Dynamic Properties | | | | | | | |
| Tensile Strength (psi) | 2680 | 2790 | 2060 | 2290 | 2270 | 2090 | 2220 |
| Elongation Percent | 640 | 590 | 580 | 580 | 570 | 550 | 530 |
| 100% Modulus (psi) | 210 | 240 | 190 | 210 | 230 | 230 | 250 |
| Trouser Tear (ppi) | 66 | 54 | 73 | 70 | 68 | 65 | 92 |
| Hardness (Shore A) | 61 | 57 | 62 | 62 | 61 | 62 | 68 |
| Ozone Resistance* | | | | | | | |
| Bent Loop (Unaged) | 24 | 24 | 1000+ | — | 1000+ | 1000+ | 1000+ |
| Bent Loop (Aged)** | 45 | 12 | 1000+ | 1000+ | 1000+ | 1000+ | 1000+ |
| Dynamic (Unaged) | 5 | 5 | 30 | 20 | 18 | 45+ | 45+ |
| Dynamic (Aged)** | 4 | 4 | 18 | 26 | 23 | 45+ | 45+ |

*Hours to failure
**Aged for 70 hours in ASTM Number 1 oil.
— Indicates not tested The above data show that the compositions of this invention exhibit desirable tensile properties and ozone resistance.

In order to measure the cut growth resistance, samples of each Example and Comparative Experiment were tested for their De Mattia Flex (ASTM D-430) The number of kilocycles until 100%, 200%, 300%, 400% and 500% cut growth were recorded, such results being presented in Table III. The test was terminated after 2,208 kilocycles for all samples Accordingly, where no number is presented in Table III, that sample had not experienced cut growth to that extent after 2,208 kilocycles.

TABLE III

| Kilocycles until percent cut growth: | Cut Growth Resistance EXAMPLE OR COMPARATIVE EXPERIMENT | | | | | | | | | | |
|---|---|---|---|---|---|---|---|---|---|---|---|
| | A | B | C | D | E | 1 | 2 | 3 | 4 | 5 | 6 | 7 |
| 100% | 0.9 | 31.0 | 2.1 | 75.8 | 2.3 | 109.5 | 14.7 | 2208 | 17.7 | 17.7 | 193.5 | 39.3 |
| 200% | 2.2 | 60.1 | 5.8 | 793.8 | 10.8 | 328.8 | 921.9 | * | 882.9 | 440.8 | * | 2048.1 |
| 300% | 3.7 | 93.0 | 17.7 | 817.0 | 26.8 | 406.2 | 1396.1 | | 1012.9 | 551.6 | | 2101.4 |
| 400% | 6.7 | 127.2 | 51.5 | 871.2 | 37.2 | 2048.1 | 2048.1 | | * | 1012.9 | | 2154.7 |
| 500% | 11.6 | 153.6 | 66.7 | 972.4 | 68.5 | * | 2208.0 | | | * | | 2208.0 |

*This extent of cut growth not reached after 2,208.0 kilocycles.

The above data indicate the unexpectedly increased cut growth resistance exhibited by the 6-component compositions of this invention relative to similar 5-component compositions Thus, a comparison of Example 3 with Comparative Experiments B and C indicates that a blend (which has been cured employing a sulfur/peroxide/sulfur cure accelerator curative composition) comprising 80 parts by weight of nitrile rubber and 20 parts by weight of EPDM with 3 parts by weight of phenylenediamine compound will require 2,208 kilocycles for cut growth to increase 100% (Example 3), whereas the same composition without the phenylenediamine compound (Comparative Experiment C) will experience a 100% increase in cut growth after only 2.1 kilocycles. This result is completely unexpected when it is observed that a 5-component blend comprising 100 parts of nitrile rubber, 0 parts of EPDM and 3 parts of phenylenediamine compound will exhibit a 100% increase in cut growth after only 31.0 kilocycles (Comparative Experiment B).

A similar result is seen when one compares the 5-component composition of Comparative Experiment D (which contains no phenylenediamine compound) with 6-component composition Example 6, which is identical to Comparative Experiment D except that 3 parts of phenylenediamine compound are additionally present.

What is claimed is:

1. A composition having improved cut growth resistance produced by curing a blend of components comprising:
   (A) at least one highly unsaturated rubber;
   (B) at least one saturated rubber;
   (C) a para-phenylenediamine antiozonant compound; and
   (D) an effective amount of a curing agent comprising:
      (i) sulfur or a sulfur donor compound;
      (ii) at least one sulfur cure accelerator; and
      (iii) at least one peroxide curative;
   wherein between about 1 and about 10 parts by weight of component (C) per 100 parts by weight of components (A) plus (B) is present, said composition having cut growth resistance as determined by ASTM D430 superior to said compositions without any one of said components (A), (B), (C), (D) (i), (D) (ii), or (D) (iii).

2. The composition of claim 1 wherein component (A) is a diene rubber and wherein component (B) is an ethylene/propylene/nonconjugated diene terpolymer.

3. The composition of claim 1 wherein component (A) is at least one member selected from the group consisting of natural rubber, cis-polyisoprene rubber, polybutadiene rubber, poly(butadiene-styrene) rubber and poly(butadiene-acrylonitrile) rubber 4. The composition of claim 1 wherein the weight ratio of component (A) to component (B) is between about 95:5 and about 50:50.

5. The composition of claim 4 wherein the weight ratio of component (A) to component (B) is between about 85:15 and about 60:40.

6. The composition of claim 5 wherein the weight ratio of component (A) to component (B) is between about 80:20 and about 70:30.

7. The composition of claim 1 wherein between about 1.5 and about 7 parts by weight of component (C) is present per 100 parts by weight of component (A) plus component (B).

8. The composition of claim 7 wherein between about 2.5 and about 4 parts by weight of component (C) is present per 100 parts by weight of component (A) plus component (B).

9. The composition of claim 1 wherein the sulfur cure accelerator is thiazole or sulfenamide sulfur cure accelerator.

10. A composition having improved cut growth resistance produced by curing a blend comprising:
(A) between about 60 and about 85 parts by weight of poly(butadiene-acrylonitrile) rubber:
(B) between about 15 and about 40 parts by weight of ethylene/propylene/nonconjugated diene terpolymer;
(C) between about 1 and about 10 parts by weight of a para-phenylenediamine compound selected from the group consisting of N-phenyl-N'-isopropyl-p-phenylenediamine, N-phenyl-N'-(1,3-dimethylbutyl)-p-phenylenediamine, N-phenyl-N'-(1,3-dimethylpentyl)-p-phenylenediamine, N,N'-diisopropyl-p-phenylenediamine, N,N'-di-secbutyl-p-phenylenediamine, N,N'-bis(1,4dimethylpentyl)-p-phenylenediamine, N,N'-bis(1-ethyl-3-methylpentyl)-p-phenylenediamine, N,N'-diphenyl-p-phenyldiamine and N-phenyl-N'-cyclohexyl-p-phenyldiamine; and
(D) an effective amount of a curing agent comprising:
(i) sulfur or a sulfur donor compound;
(ii) a thiazole or siulfenamide sulfur cure accelerator; and
(iii) dicumyl peroxide or 2,5-dimethyl2,5di-t-butyl-peroxyhexane.

11. A process for producing a cured composition having improved cut growth resistance comprising the steps of:
(I) preparing a blend comprising
(A) at least one highly unsaturated rubber;
(B) at least one saturated rubber;
(C) a para-phenylenediamine compound; and
(D) an effective amount of a curing agent comprising
(i) sulfur or a sulfur donor compound;
(ii) at least one sulfur cure accelerator; and
(iii) at least one peroxide curative;
wherein between about 1 and about 10 parts by weight of component (C) per 100 parts by weight of component (A) plus (B) is present and;
(II) curing said blend.

12. The process of claim 11 wherein component (A) is a diene rubber and wherein component (B) is an ethylene/propylene/non-conjugated diene terpolymer.

13. The process of claim 11 wherein component (A) is at least one member selected from the group consisting of natural rubber, cis-polyisoprene rubber, polybutadiene rubber, poly(butadiene-styrene) rubber and poly(butadiene-acrylonitrile) rubber.

14. The process of claim 11 wherein the weight ratio of component (A) to component (B) is between about 95:5 and about 50:50

15. The process of claim 14 wherein the weight ratio of component (A) to component (B) is between about 85:15 and about 60:40.

16. The process of claim 15 wherein the weight ratio of component (A) to component (B) is between about 80:20 and about 70:30.

17. The process of claim 11 wherein between about 1.5 and about 7 parts by weight of component (C) is present per 100 parts by weight of component (A) plus component (B).

18. The process of claim 17 wherein between about 2.5 and about 4 parts by weight of component (C) is present per 100 parts by weight of component (A) plus component (B).

19. The process of claim 11 wherein the sulfur cure accelerator is thiazole or sulfenamide sulfur cure accelerator.

* * * * *